(12) United States Patent
Pokharel

(10) Patent No.: US 10,848,449 B2
(45) Date of Patent: Nov. 24, 2020

(54) TOKEN-BASED MESSAGE EXCHANGE SYSTEM

(71) Applicant: salesforce.com, inc., San Francisco, CA (US)

(72) Inventor: Anurodh Pokharel, Brookline, MA (US)

(73) Assignee: salesforce.com, inc., San Francisco, CA (US)

( * ) Notice: Subject to any disclaimer, the term of this patent is extended or adjusted under 35 U.S.C. 154(b) by 47 days.

(21) Appl. No.: 16/135,968

(22) Filed: Sep. 19, 2018

(65) Prior Publication Data

US 2020/0092240 A1    Mar. 19, 2020

(51) Int. Cl.
    *H04L 12/58*    (2006.01)
(52) U.S. Cl.
    CPC .................. *H04L 51/12* (2013.01)
(58) Field of Classification Search
    CPC ....................................................... H04L 51/12
    USPC ......................................................... 709/206
    See application file for complete search history.

(56) References Cited

U.S. PATENT DOCUMENTS

| 10,026,082 | B2 | 7/2018 | Davis | |
| 2010/0250947 | A1* | 9/2010 | Wong | H04L 63/0823 713/175 |
| 2016/0283920 | A1 | 9/2016 | Fisher et al. | |
| 2017/0161701 | A1 | 6/2017 | Amancherla | |
| 2019/0007381 | A1* | 1/2019 | Isaacson | G06Q 30/0625 |
| 2019/0028278 | A1* | 1/2019 | Gilson | H04L 9/3247 |
| 2019/0220856 | A1* | 7/2019 | Li | G06Q 20/10 |
| 2019/0303892 | A1* | 10/2019 | Yantis | G06Q 20/389 |
| 2019/0325452 | A1* | 10/2019 | Farjami | G06Q 50/14 |
| 2019/0334904 | A1* | 10/2019 | Lelcuk | H04L 63/20 |
| 2019/0354397 | A1* | 11/2019 | Goel | G06F 9/4881 |
| 2019/0370799 | A1* | 12/2019 | Vivas | G06Q 20/3829 |
| 2019/0373137 | A1* | 12/2019 | Krukar | G06F 3/1222 |
| 2020/0007464 | A1* | 1/2020 | Lo | H04L 9/0643 |
| 2020/0076884 | A1* | 3/2020 | Li | H04L 9/3073 |
| 2020/0134612 | A1* | 4/2020 | Fostiropulo | G06Q 20/389 |
| 2020/0160340 | A1* | 5/2020 | Walters | G06Q 20/0658 |

* cited by examiner

*Primary Examiner* — James E Springer
(74) *Attorney, Agent, or Firm* — Kowert, Hood, Munyon, Rankin & Goetzel, P.C.

(57) ABSTRACT

Techniques are disclosed relating to exchanging tokens for processing messages. A first system may access information identifying a first requested amount of tokens for a message to be processed by a second system. The first system may cause a first transaction to be written to a distributed ledger that records a transfer of the first requested amount from an account of the first system to an account of the second system. The first system may send a message to the second system. The first system may provide information identifying a second requested amount of tokens for a message to be processed by the first system. The first system may process a message from a third system in response to verifying that there is a second transaction that records a transfer of the second requested amount from an account of the third system to the account of the first system.

20 Claims, 8 Drawing Sheets

TOKEN-BASED MESSAGE EXCHANGE SYSTEM

BACKGROUND

Technical Field

This disclosure relates generally to a message exchange system.

Description of the Related Art

Although some computer systems operate in an isolated environment, most computer systems in practice communicate with other computer systems via some form of a network. Such a network may vary from a personal area network to a local area network to a wide area network such as the Internet. As the size of a network grows, it becomes more likely that a computer system coupled to the network may choose to send unwanted messages to other systems in the network. For example, a malicious computer system may be configured to bombard other computer systems with spam. These undesired messages thus waste processing resources of the recipient computer systems.

Figure 1:
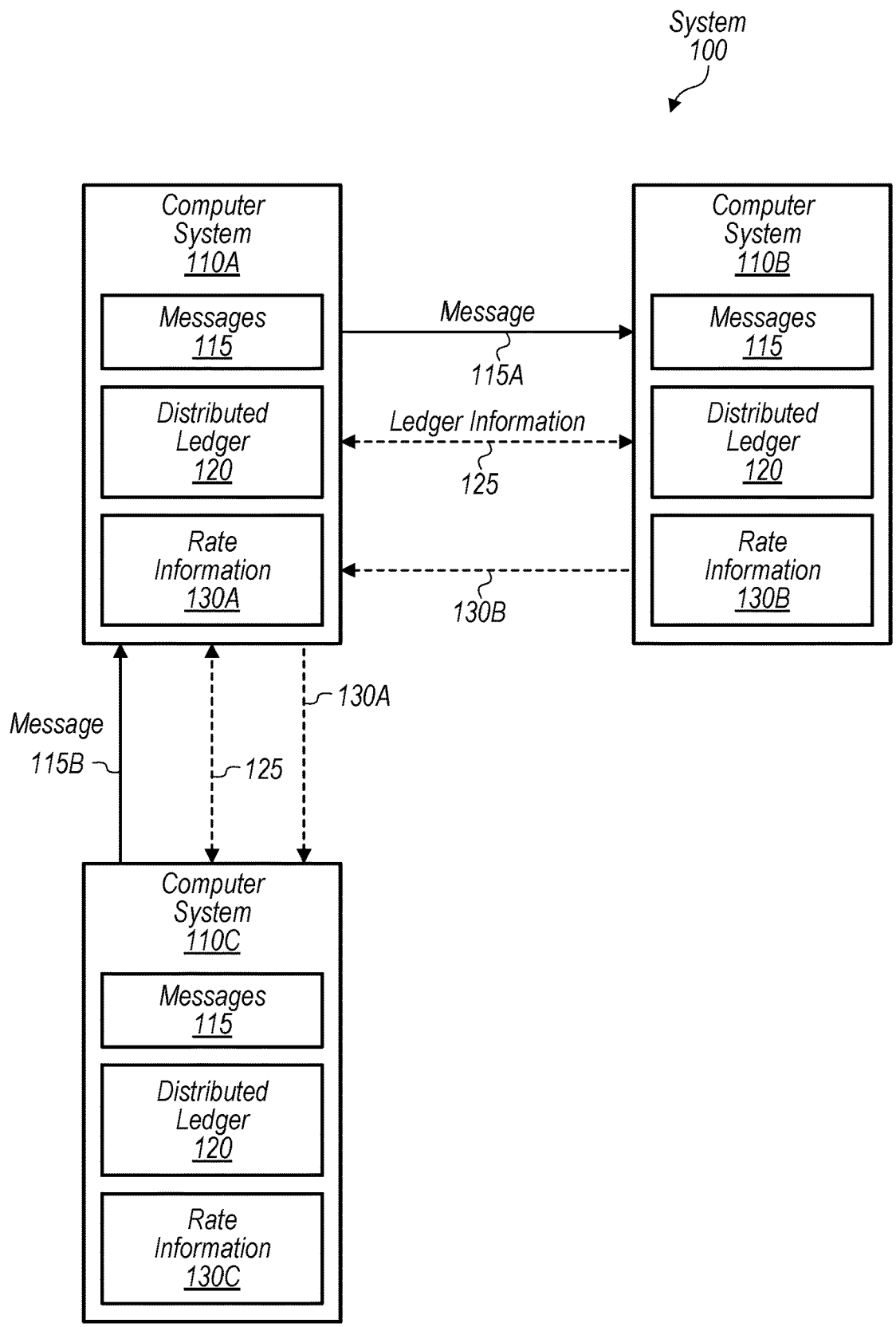
FIG. 1 is a block diagram illustrating example elements of a system in which computer systems trade tokens in order to have messages processed, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a distributed ledger that includes multiple transactions, the terms "first" portion and "second" transaction can be used to refer to any transaction within the distributed ledger. In other words, the first and second transactions are not limited to the initial two transactions within the distributed ledger.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes various techniques for implementing a system where computer systems process messages or have messages processed based on exchanges of tokens between those computer systems. In various embodiments described below, a set of computer systems participate in a decentralized, token-based, authorization system in which a distributed ledger is used for storing records that specify transactions that involve the transfer of tokens between accounts associated with those computer systems. Generally speaking, a token refers to a digital item that is deemed to have value within the context of the token-based system. As an example, three tokens may be sufficient for having three messages be processed by a system that receives those tokens. Accordingly, a computer system (the "sending computer system"), wishing to have a message be processed by another computer system (the "receiving computer system"), may transfer tokens from an account associated with the sending computer system to an account associated with the receiving computer system by causing a transaction to be written (or committed) to the ledger. It is noted that the term "write" is used interchangeably with the term "commit" within this disclosure. In such embodiments, the sending computer system may access information identifying an amount of tokens requested by the receiving computer system before it will process one or more messages. The sending computer system may thus determine if it has sufficient tokens in its account to meet the requested amount and, if so, may transfer the requested amount of tokens to the account associated with the receiving computer system using a ledger (which may be implemented as a blockchain). Accordingly, the sending computer system may have a message processed by the receiving computer system once the receiving system has verified that the tokens have been transferred to its associated account. In some instances, a computer system may desire to send multiple messages and thus may transfer a sufficient amount of tokens in order to have the receiving computer system process all messages. In various embodiments, a sending computer system can also serve as a receiving computer system and thus may provide information to the other computer systems in the authorization system that specifies a requested amount of tokens before a message will be processed. That computer system may thus process a message after verifying that the requested amount of tokens has been transferred.

These techniques may be advantageous over prior approaches as these techniques allow for a system to be implemented in which malicious computer systems are disincentivized from spamming legitimate computer systems. That is, malicious computer systems may be unlikely to receive requests to process messages (or responses) and thus, will quickly run out of tokens if they spam other computer systems. Once out of tokens, a malicious computer system would have to spend precious resources obtaining more tokens (e.g., by using central processing unit (CPU) cycles to write transactions to the distributed ledger, which may be implemented as a blockchain). Additionally, implementing a system that uses a distributed ledger such as a blockchain may allow for the system to be decentralized so that other computer systems may more readily join (or participate) in the system and there is no central authority that controls the system. Moreover, using a distributed ledger such as a blockchain may prevent manipulation of transactions that are recorded in an entry of the distributed ledger (as such an entry may be linked to a previous entry). A system for implementing these techniques will now be discussed below, starting with FIG. 1.

Turning now to FIG. 1, a block diagram of a system 100 is shown. System 100 is a set of components that are implemented via hardware or a combination of hardware and software routines. In the illustrated embodiment, system 100 includes computer systems 110 that have a distributed ledger 120 and rate information 130. As further shown, computer systems 110 are configured to directly (or, in some cases, indirectly) communicate information associated with messages 115, distributed ledger 120, and rate information 130 to other computer systems 110 in system 100. In some embodiments, system 100 is implemented differently than depicted—e.g., rate information 130 may be maintained externally to computer systems 110.

Computer systems 110, in various embodiments, are systems that are in communication with one another—such communication includes sending and receiving messages 115 to be processed. Examples of computer systems 110 include, but are not limited to, mobile devices, desktop computers, server systems, and enterprise systems (which may include all systems that are under the authority of an entity such as a company). The messages 115 exchanged between computer systems 110 may, for example, specify tasks to be handled by the receiving computer system 110, acknowledge the completion of tasks, include data to be operated on (e.g., stored), and/or convey the occurrence of an event—broadly speaking, messages 115 may be requests, replies, or simply plain information (e.g., an error message). As an example, computer system 110A may send a message 115A to computer system 110B that instructs system 110B to delete a particular file from a database. System 110B may process that message 115 by deleting that file.

In some embodiments, computer systems 110 may each maintain message queues (not shown) that temporarily store messages 115 while that computer system 110 determines whether to process those messages and whether the necessary resources are available. When determining whether to process a message 115, a computer system 110 may consider whether it has received tokens from the requesting computer system 110. To this end, in various embodiments, a particular computer system 110 may maintain rate information 130 specifying an amount of tokens requested by the particular system before it will process a message. Accordingly, a computer system 110 may confirm, before it processes a message, that the requested amount of tokens has been received from the requesting computer system 110 by checking distributed ledger 120.

Distributed ledger 120, in various embodiments, is a collection of records that include transactions detailing exchanges of tokens between computer systems 110. Distributed ledger 120 may, for example, be a blockchain having block records that are linked and secured using cryptographic algorithms. In some cases, various ones of computer systems 110 may maintain their own copies of distributed ledger 120 that they update based on verified records written either by themselves or other systems 110. Thus, updates to distributed ledger 120 may be distributed to computer systems 110 in ledger information 125.

In preparation for sending one or more messages, a computer system 110 may cause a transaction to be written (or committed) to distributed ledger 120 that records a transfer of tokens from an account of that computer system 110 to an account of the other computer system 110 to which the one or more messages are being sent. In some cases, a computer system 110 may broadcast the transaction so that other computer systems 110 may add the transaction to a pool of transactions that they are attempting to write as a record to distributed ledger 120—a process that is described in greater detail below with respect to FIG. 2. In various embodiments, after a transaction has been written to ledger 120 that records a transfer of the requested amount of tokens or a multiple thereof, a computer system 110 then sends the one or more messages that are covered by the token transfer to the receiving computer system 110. The receiving computer system 110 may check its own copy of the distributed ledger 120 to determine if the tokens have been transferred to an account with which it is associated and, if so, may then process the one or more messages.

Rate information 130, in various embodiments, specifies an amount of tokens requested by a computer system 110 before it will process a received message 115. As will be discussed in greater detail below with respect to FIG. 4, rate information 130 may fluctuate in some cases based on the conditions being experienced by the receiving computer system 110. Accordingly, in various embodiments, a requesting computer system 110 may access rate information 130 in order to determine the latest/current rate for (or amount of tokens requested by) the receiving computer system 110.

In one example use case of system 100, computer system 110A may wish to send a message 115A to computer system 110B that instructs system 110B to update a record within its database. In preparation for sending message 115A, computer system 110A may access rate information 130B that specifies, for example, a rate of 20 tokens per message. Accordingly, computer system 110A may then cause a transaction to be written to ledger 120 that specifies a transfer of 20 tokens from its account to an account associated with computer system 110B. Note that, in some cases, a computer system 110 may be a part of a group of computer systems 110 that share an account. This allows an entity such as a company to have one or more accounts that cover multiple computer systems associated with that entity. Computer system 110A may then send message 115A to computer system 110B. When determining whether to process the message (which may be queued in some instances), computer system 110B may inspect distributed ledger 120 to determine if there is a transaction that specifies a transfer of 20 tokens to its account from an account associated with computer system 110A. In response to locating the transaction written by computer system 110A that specifies such a transfer, computer system 110B may process message 115A. Note that in other implementations, computer system 110A might send message 115A before writing to distributed ledger 120.

Continuing with the example use case, computer system 110A may provide rate information 130A to computer system 110C in response to a request from system 110C for the information. In one example, rate information 130A might specify a rate of 21 tokens per message. In response to receiving a message 115C from computer system 110C, computer system 110A may inspect distributed ledger 120 for a transaction that specifies a transfer of 21 tokens from the account of computer system 110C to the account of computer system 110A. In response to locating such a transaction, computer system 110A may process message 115C.

Implementing system 100 in this manner may be advantageous over prior approaches as it allows for legitimate computer systems to continually communicate with each other while potentially hindering malicious computer systems. It is common for an exchange of messages between two legitimate computer systems to be a two-way affair. Thus, a legitimate computer system may have to transfer a number of token to send a message, but would gain those tokens back upon receiving a response from the other computer system. This pattern of messaging (e.g., relaying and replying) could continue in a manner such that neither computer system would have a substantial deficit of tokens. In the case of a malicious computer system, however, such a system might quickly expend all of the tokens in its account by spamming other computer systems. The malicious computer system would then have to either expend resources in order to obtain new tokens or wait for responses (which may not happen if, for example, the other computer systems flag the malicious computer system as a potential spammer). The particulars of using distributed ledger 120 for recording transactions between computer systems 110 will now be discussed in greater detail below.

Figure 2:
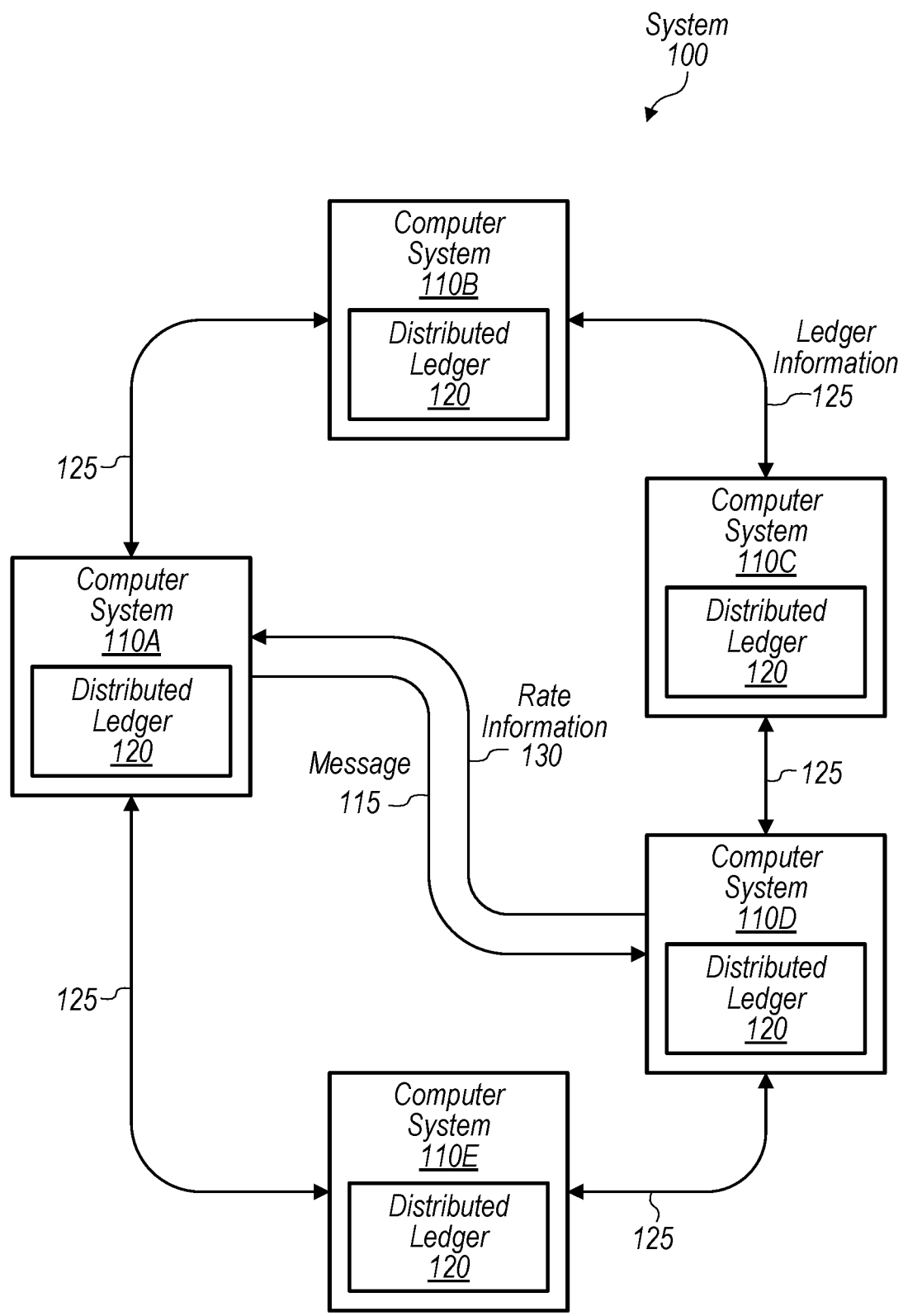
FIG. 2 is a block diagram illustrating example elements of using a distributed ledger to record transactions between computer systems, according to some embodiments.

Turning now to FIG. 2, another block diagram of system 100 is shown. In the illustrated embodiment, system 100 includes computer systems 110 that have distributed ledger 120 (e.g., a copy of ledger 120). In some embodiments, system 100 is implemented differently shown—e.g., rate information 130 may be maintained at a central location as opposed to computer systems 110 providing such information directly to other computer systems 110.

Distributed ledger 120, in various embodiments, implements a blockchain that includes records specifying transactions that involve computer systems 110. In the blockchain context, transactions may be committed to the blockchain through a series of steps. In the initial step, a computer system 110 may generate a transaction identifying an exchange of tokens from one account to another account. That computer system 110 may then broadcast that transaction to a set of computer systems 110, which may themselves broadcast that transaction to another set of computer systems 110. Computer systems 110 that are made aware of that transaction may add it to a record of transactions that they are attempting to commit to the blockchain. Within the blockchain context, the computer system 110 that successfully commits the record to the blockchain (e.g., by solving a mathematical challenge that may involve producing a hash value less than a threshold value) may then broadcast the record to the computer system 110 so that they can update their blockchain. Accordingly, while a computer system 110 that wants to send a message may not actually write the transaction to distributed ledger 120 for transferring the requested amount of tokens, in various embodiments, that computer system 110 may cause the transaction to be written by broadcasting it to other computer systems 110, one of which may actually write the transaction to distributed ledger 120.

Accordingly, in the illustrated embodiment, if computer system 110A wishes to send a message 115 to computer system 110D, then computer system 110A may create a transaction that transfers the amount of tokens (designated in rate information 130 from computer system 110D) from an account associated with computer system 110A to an account associated with computer system 110B. Computer system 110A may then broadcast that transaction in ledger information 125 to computer systems 110B and 110E, which may broadcast the transaction to computer systems 110C and 110D, respectively. Once computer system 110A determines that the transaction has been committed to distributed ledger 120, computer system 110A may send a message 115 to computer system 110D. The particulars of preparing and sending messages will now be discussed in greater detail below.

Figure 3:
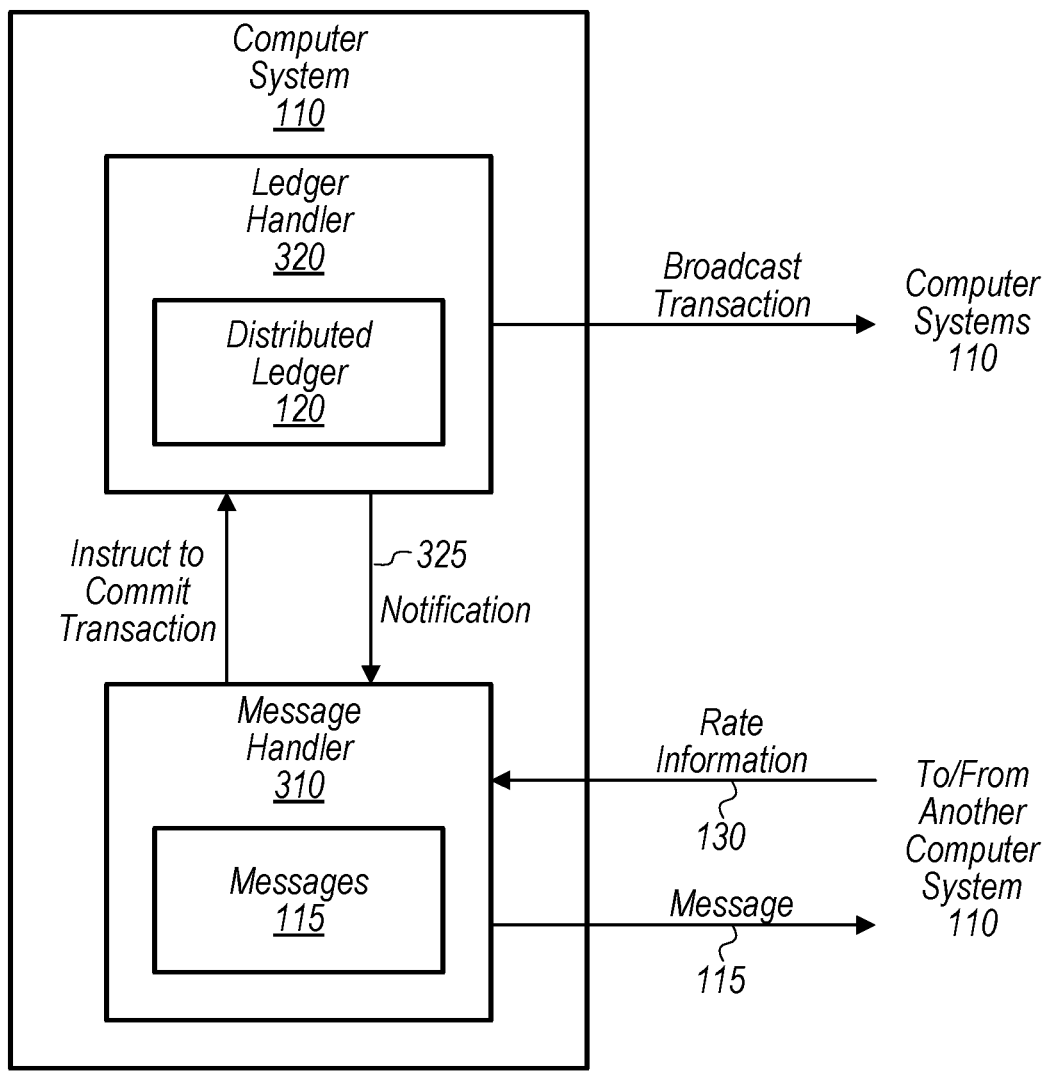
FIG. 3 is a block diagram illustrating example elements of a computer system sending a message to another computer system for processing, according to some embodiments.

Turning now to FIG. 3, a block diagram of an example computer system 110 preparing and sending messages to another computer system 110 is shown. In the illustrated embodiment, computer system 110 includes a message handler 310 and a ledger handler 320. As depicted, message handler 310 includes messages 115 and ledger handler 320 includes distributed ledger 120. In some embodiments, computer system 110 is implemented differently than shown—e.g., message handler 310 may include rate information 130.

Message handler 310, in various embodiments, is a set of software routines executable to facilitate the sending of messages 115 to other computer systems 110 in system 100. When sending messages 115 to another computer system 110, message handler 310 may assess a set of factors in preparation for sending those messages 115, including the priority of the messages 115 and the amount of tokens available to the computer system 110 for satisfying the amount of tokens requested by the other computer system 110.

As mentioned earlier, the amount of tokens requested by another computer system 110 for processing a message 115 may vary depending upon the conditions (e.g., server load) being experienced by that computer system 110. As such, in various embodiments, message handler 310 considers the rate of the receiving computer system 110 and determines to send only those message 115 that have a certain priority. That is, message handler 310 may decide to not send non-prioritized messages 115 (e.g., automatic messages) if the cost of sending those messages is too steep. Thus, in various embodiments, message handler 310 assigns a level of priority to messages 115. Message handler 310 may then compare the level of priority of a message 115 to a threshold level of priority that was determined based on the rate of the receiving computer system 110 (as specified in rate information 130). If a message 115 is important enough, then message handler 310 may instruct ledger handler 320 to cause a transaction to be committed to distributed ledger 120 that records a transfer of the requested amount of tokens. Message handler 310 may then send that message to the receiving computer system 110. If, however, a message 115 is not important enough, then message handler 310 may maintain that message 115 in a queue until the rate of the receiving computer system 110 decreases (resulting in the threshold level of priority decreasing as well) before sending it.

The threshold priority level may be adjusted in various manners. Message handler 310 may, in various cases, adjust the threshold priority level in a static manner—namely, according to a predetermined scheme in which the correspondence between a particular priority level and a token amount is preset. For example, the priority levels of "1" and "2" may correspond to 10 and 20 tokens, respectively. Accordingly, message handler 310 may set the threshold priority level based on the requested amount of tokens in accordance with static rules. Message handler 310, however, may adjust the threshold priority level in a dynamic manner—namely, according to a scheme that may seek to achieve a particular goal. For example, message handler 310 may wish to send only about a thousand messages per hour and thus may raise or lower the threshold priority level to achieve that goal. If, for example, message handler 310 needs to send more of its messages 115 to meet the thousand messages per hour goal, then it may lower the threshold priority level, allowing for more messages 115 to be sent. In some instances, message handler 310 may consider the number of tokens that are currently in circulation and adjust the priority levels to account for inflation rates tied to those tokens—thus, the correspondence between a particular priority level and a token amount may dynamically change.

When sending a message 115, in various embodiments, message handler 310 considers whether the account associated with computer system 110 includes sufficient tokens to satisfy the amount of tokens requested by the receiving computer system 110. In the cases where the account does not include sufficient tokens, a computer system 110 may obtain tokens through a number of different ways. In some embodiments, a computer system 110 may receive tokens in exchange for committing transactions to distributed ledger 120. In the blockchain context, before successfully committing a record to the blockchain, a computer system 110 may add a transaction to that record that grants a particular amount of tokens, which may be specified as a feature of system 100, to that computer system 110. In some embodiments, a computer system 110 receives token into its associated account from other computer systems 110 in system 100 outside the context of processing messages. For example, tokens may be redistributed among legitimate computer systems 110—this allows for legitimate computer system 110 to continue to communicate with each other by sharing their tokens with other legitimate systems 110 that have run out of tokens. As another example, a computer system 110 may provide resources or services (e.g., storage) to another computer system 110 in exchange for tokens.

In some embodiments, a computer system 110 is allocated an initial amount of tokens when participating in system 100. As an example, when deploying system 100 to a pre-existing system where computer systems 110 communicate by sending messages (absent, e.g., ledger 120), the initial allocation of tokens to those computer system 110 may be based on existing message rates. Accordingly, a computer system 110 that has historically sent and received a high volume of messages 115 may receive a greater allocation of tokens than another computer system 110 that has sent and received a lower volume of messages 115. When system 100 is setup, an initial set of transactions may be written to distributed ledger 120 that record transfers of the initially allocated amounts into the appropriate accounts of computer systems 110.

In various embodiments, message handler 310 also takes into consideration the number of messages 115 that it intends to send (within a certain interval of time). In various cases, the amount of time required for a transaction to be committed to distributed ledger 120 and verified might make writing a transaction for each message 115 impractical. For example, in the blockchain context, committing a transaction to a blockchain may take 10 minutes; however, a computer system 110 may be sending millions of messages a day. Thus, in some embodiments, message handler 310 instructs ledger handler 320 to cause a single transaction to be written that transfers a bulk amount of tokens based on the number of messages 115 that message handler 310 intends to send. Accordingly, message handler 310 may cause a transaction to be written that allows message handler 310 to send multiple messages 115 without having to write multiple transactions.

Ledger handler 320, in various embodiments, is a set of software routines executable to cause a transaction to be written to distributed ledger 120. Accordingly, ledger handler 320 may be in communication with other ledger handlers 320 within other computer systems 110 in system 100. In some embodiments, ledger handler 320 may attempt to commit a transaction to distributed ledger 120 in response to receiving a transaction from another ledger handler 320 or message handler 310. After a transaction has been written to distributed ledger 120, ledger handler 320 may send a notification 325 notifying message handler 310 about the commitment of the transaction to distributed ledger 120 so that handler 310 can then send the appropriate messages 115 to the appropriate computer systems 110. The particulars of processing messages 115 received from other computer systems 110 will now be discussed in greater detail below.

Figure 4:
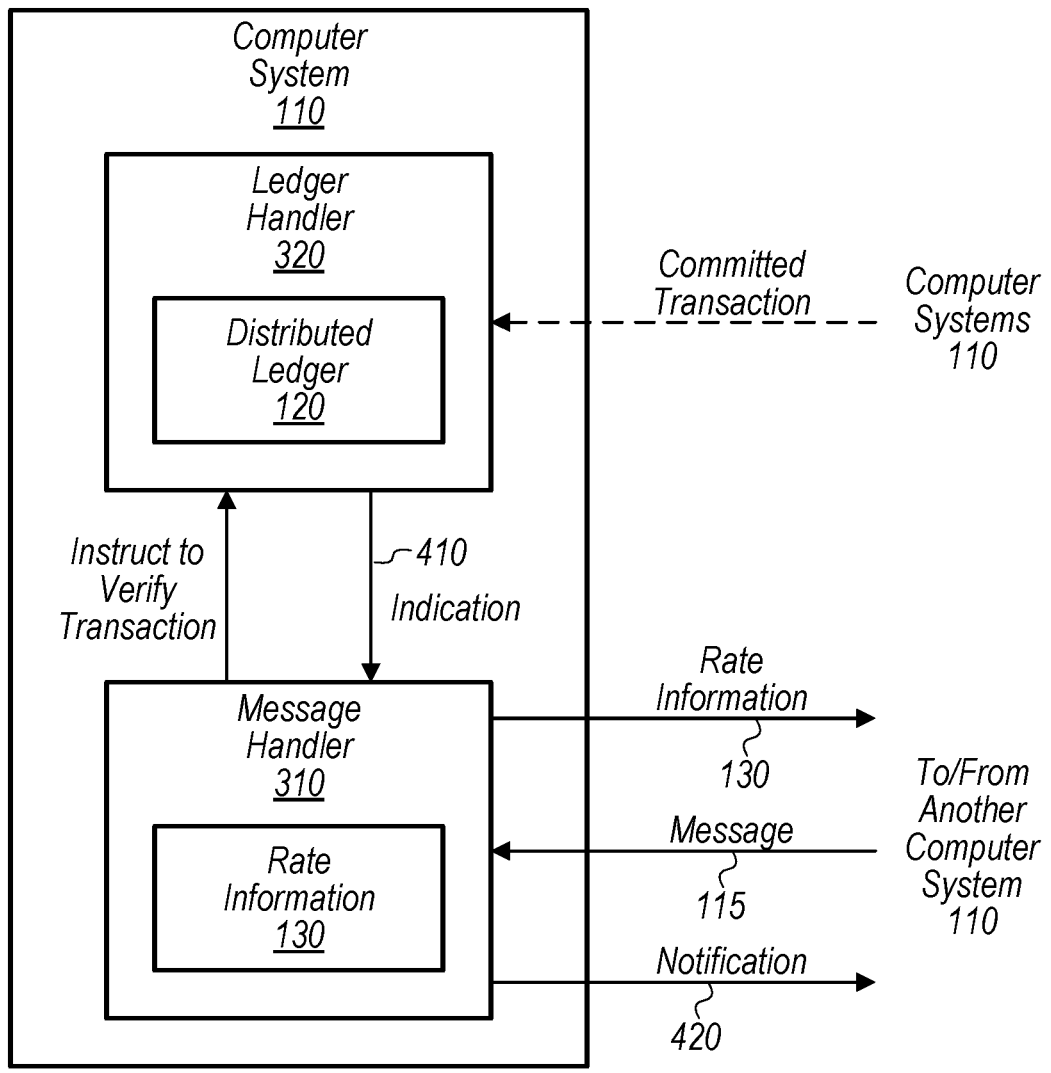
FIG. 4 is a block diagram illustrating example elements of a computer system receiving a message from another computer system for processing, according to some embodiments.

Turning now to FIG. 4, a block diagram of an example computer system 110 receiving and then processing messages from another computer system 110 is shown. In the illustrated embodiment, computer system 110 includes message handler 310 and ledger handler 320. As depicted, message handler 310 includes rate information 130 and ledger handler 320 includes distributed ledger 120. In some embodiments, computer system 110 may be implemented differently—e.g., rate information 130 may be located at a central system.

Message handler 310, in various embodiments, handles the processing of messages 115 received from other computer systems 110. Prior to receiving a message 115, message handler 310 may provide rate information 130 in response to a request from another computer system 110. Such a request may be received via an application programming interface (API) supported by message handler 310. In various instances, that request is made by another computer system 110 because rate information 130 may be continually changing.

As mentioned earlier, the requested amount of tokens specified in rate information 130 may vary depending upon the conditions being experienced by computer system 110. In some embodiments, as the workload experienced by computer system 110 increases, the amount of tokens requested by computer system 110 also increases. This may provide a way for computer system 110 to indicate how busy it is to other computer systems 110—thus acting to deter computer systems 110 that wish to send messages 115 to another computer system 110 but are unwilling to cover the higher token cost. In a similar manner, as the workload decreases, the requested amount of tokens may also decrease. Note that the workload may correspond to the overall workload of computer system 110, not just the workload associated with messages 115. In some embodiments, the number of messages 115 in computer systems 110's queue may be used to determine the requested amount of tokens. For example, the greater the number of messages 115 in the queue (e.g., messages 115 that still need to be processed), the more tokens may be requested by computer system 110 in order to process an incoming message. In some embodiments, the amount of tokens requested by computer system 110 may be based on a historical message exchange between computer system 110 and other computer systems 110. For example, if computer system 110 suspects that a certain computer system 110 is a spammer based on a previous message exchange between the two systems 110, then the requested amount of tokens may be higher.

In some embodiments, the number of tokens requested to process a message 115 may vary based on the type of message 115. For example, a message 115 of a particular type generally requiring more time to process than another type may require more tokens to be transferred to computer system 110. More generally, the number of tokens requested to process a message 115 may vary based on the amount of resources required for processing that message 115. Message handler 310, in various embodiments, may maintain information that identifies the type of message 115 paid for by another computer system 110 so that message handler 310 may determine, at a later point, whether to process a particular message 115 from that computer system 110 based on its type.

The rate of change to rate information 130, in various embodiments, may be constricted. For example, in some cases, rate information 130 may be updated at set intervals (e.g., every hour). Accordingly, computer systems 110 may request rate information 130 at the set intervals.

When processing a message 115 from a computer system 110, in various embodiments, message handler 310 may consider whether the requested amount of tokens have been transferred from an account of that computer system 110. Accordingly, message handler 310 may instruct ledger handler 320 to search for a transaction that would correspond to a message 115. It is noted that transactions may not identify specific messages 115 to process, but instead may serve as an agreement to process a particular amount of messages 115. Accordingly, when causing a transaction to be written, the sending computer system 110 may not identify in the transaction any of the messages 115 that it intends to have processed. Instead, the sending computer system 110 may, by identifying some multiple of tokens, implicitly receive authorization that multiple messages from that sending computer system may be processed. If ledger handler 320 determines that enough tokens have been transferred for processing a message based on one or more transactions written in the distributed ledger 120, in various embodiments, ledger handler 320 then sends an indication 410 to message handler 310 that indicates such. Based on indication 410 (e.g., based on whether it indicates that enough tokens have been transferred), message handler 310 may send a notification 420 to the sending computer system 110 that indicates that its message 115 will be processed. Message handler 310 may then process the message 115.

If the requested amount of tokens has not been received for a message 115, in various embodiments, message handler 310 may discard that message 115. In some embodiments, message handler 310 may temporarily maintain a message 115 for an interval of time to allow for changes to distributed ledger 120 to be propagated to computer systems 110 in system 100.

In some embodiments, a given computer system 110 may transfer an amount of tokens sufficient for allowing that system 110 to send multiple messages 115 without having to cause multiple transactions to be written to distributed ledger 120—e.g., a single transaction may be used to enable bulk messaging. In some embodiments, computer system 110 may provide rate information 130 that identifies a bulk transfer rate (e.g., 1000 tokens for 100 messages) to allow for bulk messaging. In other embodiments, the computer system 110 that intends to send multiple messages transfers a multiple of the requested amount (if, e.g., the requested amount is on a per-message basis). In various embodiments, message handler 310 stores an indication of the number of remaining messages that it will process for another computer system 110. For example, if message handler 310 agrees to process seven messages 115 for another computer system 110 and receives a message 115 from that system 110, then it may process that message 115 and update the number of remaining messages 115 that it agrees to process to indicate six messages 115. In some embodiments, message handler 310 does not consult ledger handler 320 while the number of remaining messages 115 that it agrees to process is more than zero.

Figure 5:
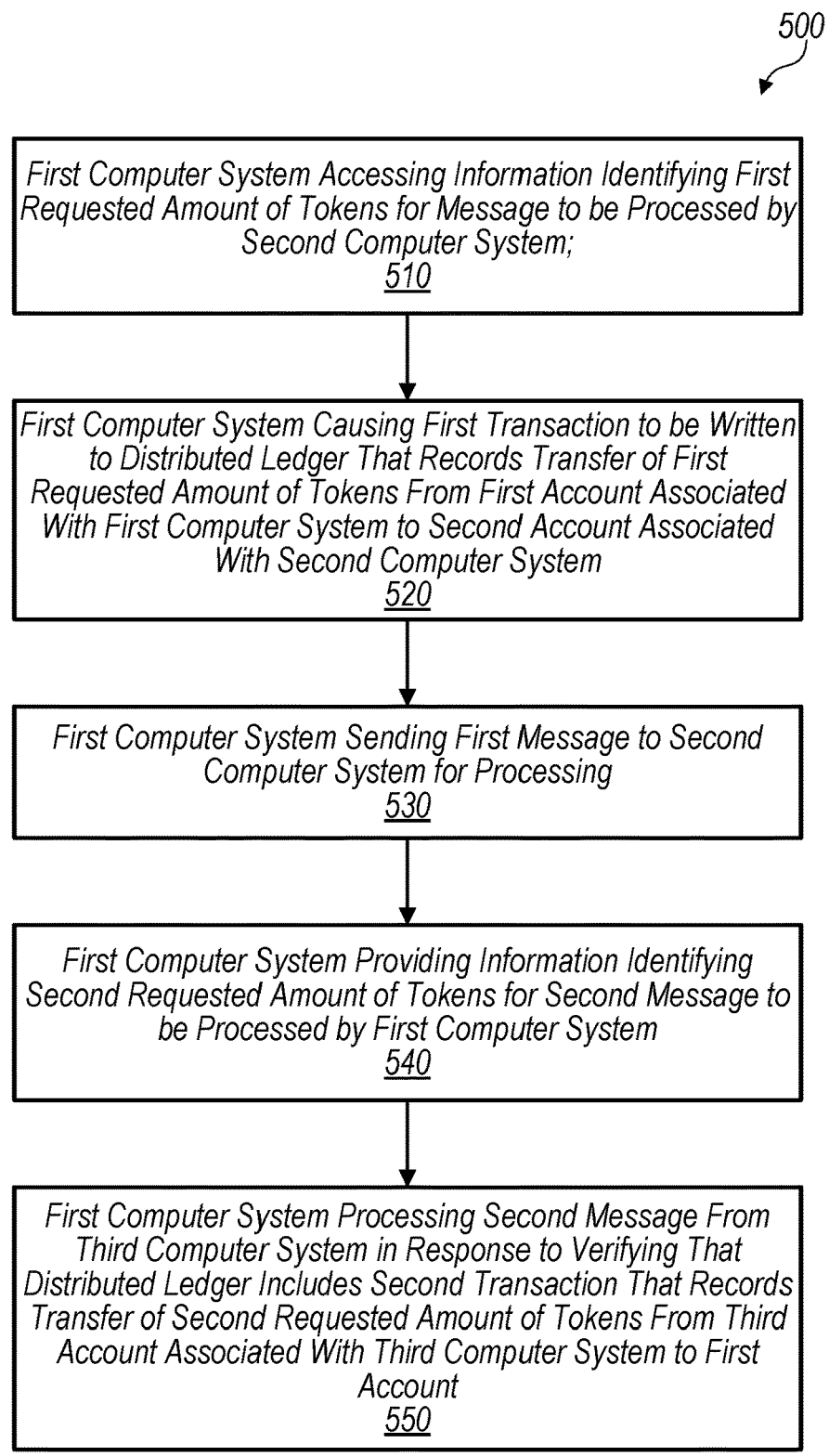
FIGS. 5-7 are flow diagrams illustrating example methods relating to exchanging tokens and messages between computer systems, according to some embodiments.

Turning now to FIG. 5, a flow diagram of a method 500 is shown. Method 500 is one embodiment of a method performed by a first computer system (e.g., computer system 110A) in order to send a message (e.g., message 115) to a second computer system (e.g., system 110B) for processing and in order to process a message received from a third computer system (e.g., system 110C). In some embodiments, method 500 may include additional steps such as the first computer system determining to process a plurality of messages from a fourth computer system in response to verifying that a distributed ledger (e.g., ledger 120) includes a transaction that records a transfer of sufficient tokens for processing the plurality of messages.

Method 500 begins in step 510 with the first computer system accessing information (e.g., rate information 130B) that identifies a first requested amount of tokens for a message to be processed by the second computer system.

In step 520, the first computer system causes a first transaction to be written to a distributed ledger. The first transaction may record a transfer of the first requested amount of tokens from a first account associated with the first computer system to a second account associated with the second computer system. In some embodiments, the first computer system receives, in the first account, an allotment of tokens that is based on a historical message rate associated with the first computer system sending messages to ones of a plurality of computer systems prior to participating in a token-based authorization system (e.g., system 100) that uses the distributed ledger to record transactions involving the transferring of tokens between ones of the plurality of computer systems. The first computer system may transfer a portion or all of the allotted tokens to the second account.

In step 530, the first computer system sends a first message (e.g., message 115A) to the second computer system for processing. In some embodiments, the first computer system determines to send the first message based on a priority level of the first message. In some embodiments, first computer system determines to not send a third message based on a priority level of the third message not satisfying a threshold priority level. In response to determining to not send the third message, the first computer system may queue the third message and, in response to an adjustment to the threshold priority level resulting in the priority level of the third message satisfying the threshold priority level, the first computer system may send the third message. In some embodiments, the first computer system dynamically adjusts the threshold priority level in response to changes in the first requested amount of tokens. In some cases, adjusting the threshold priority may be performed to satisfy one or more criteria. In some embodiments, the first transaction does not identify a particular message and thus the first computer system selects the first message from a set of messages for sending to the second computer system.

In step 540, the first computer system provides information (e.g., information 130A) that identifies a second requested amount of tokens for a second message to be processed by the first computer system. In some embodiments, the first computer system determines the second requested amount of tokens based on a message exchange history between the first computer system and the third computer system.

In step 550, the first computer system processes the second message from a third computer system in response to verifying that the distributed ledger includes a second transaction that records a transfer of the second requested amount of tokens from a third account associated with the third computer system to the first account. In response to receiving the second message and verifying that the distributed ledger includes the second transaction, in some embodiments, the first computer system provides, to the third computer system, a notification indicating that the second message is to be processed. The first computer system may increase the second requested amount of tokens for subsequent messages in response to determining to process the second message.

Figure 6:
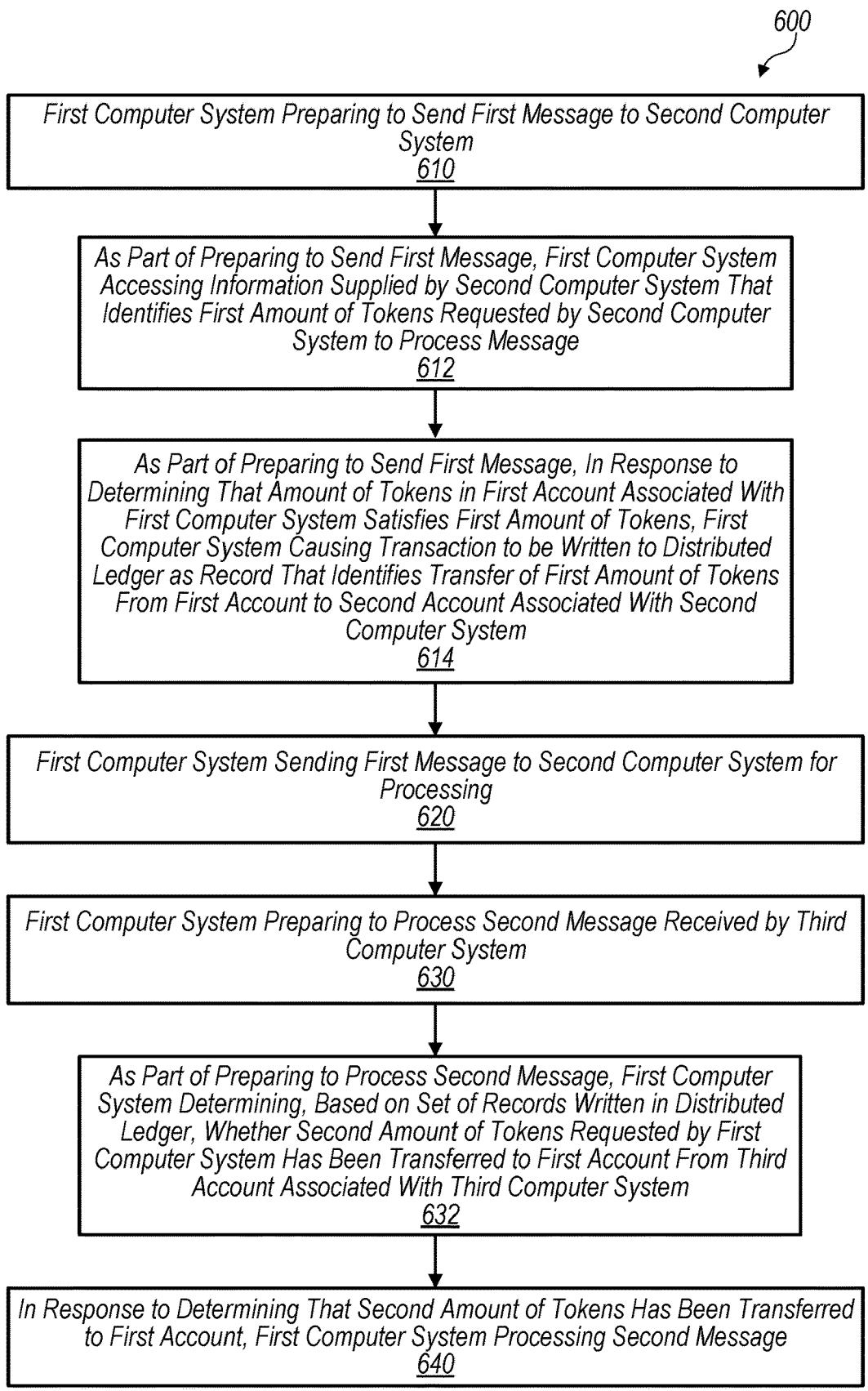

Turning now to FIG. 6, a flow diagram of a method 600 is shown. Method 600 is one embodiment of a method performed by a first computer system (e.g., computer system 110A) in order to send a message (e.g., message 115) to a second computer system (e.g., system 110B) for processing and in order to process a message received from a third computer system (e.g., system 110C). Method 600 may be performed by executing a set of program instructions stored on a non-transitory computer-readable medium. Method 600 may include additional steps—e.g., the first computer system may adjust, based on its processing load, the amount of tokens that it requests to process a message Method 600 begins in step 610 with the first computer system preparing to send a first message to the second computer system. As part of the process for preparing to send the first message, in step 612, the first computer system accesses information (e.g., rate information 130B) supplied by the second computer system identifying a first amount of tokens requested by the second computer system to process a message. As part of the process for preparing to send the first message, in step 614, in response to determining that an amount of tokens in a first account associated with the first computer system satisfies the first amount of tokens, the first computer system causes a transaction to be written to a distributed ledger (e.g., distributed ledger 120) as a record that identifies a transfer of the first amount of tokens from the first account to a second account associated with the second computer system. The first computer system, in some embodiments, maintain a local copy of the distributed ledger. Accordingly, in response to writing an additional record to the local copy of the distributed ledger, the first computer system may broadcast the additional record to multiple computer systems, including the second computer system.

In step 620, the first computer system sends the first message to the second computer system for processing. Based on the first amount of tokens, the first computer system may determine to send only messages that have at least a particular priority level. Accordingly, the first message may be associated with a priority level satisfying the particular priority level.

In step 630, the first computer system prepares to process a second message received by the third computer system. As part of the process for preparing, in step 632, the computer system determines, based on a set of records written in the distributed ledger, whether a second amount of tokens requested by the first computer system has been transferred to the first account from a third account associated with the third computer system.

In step 640, the in response to determining that the second amount of tokens has been transferred to the first account, the first computer system processes the second message. In response to determining that the second amount of tokens has not been transferred to the first account, the first computer system may discard the second message instead of processing it.

Figure 7:
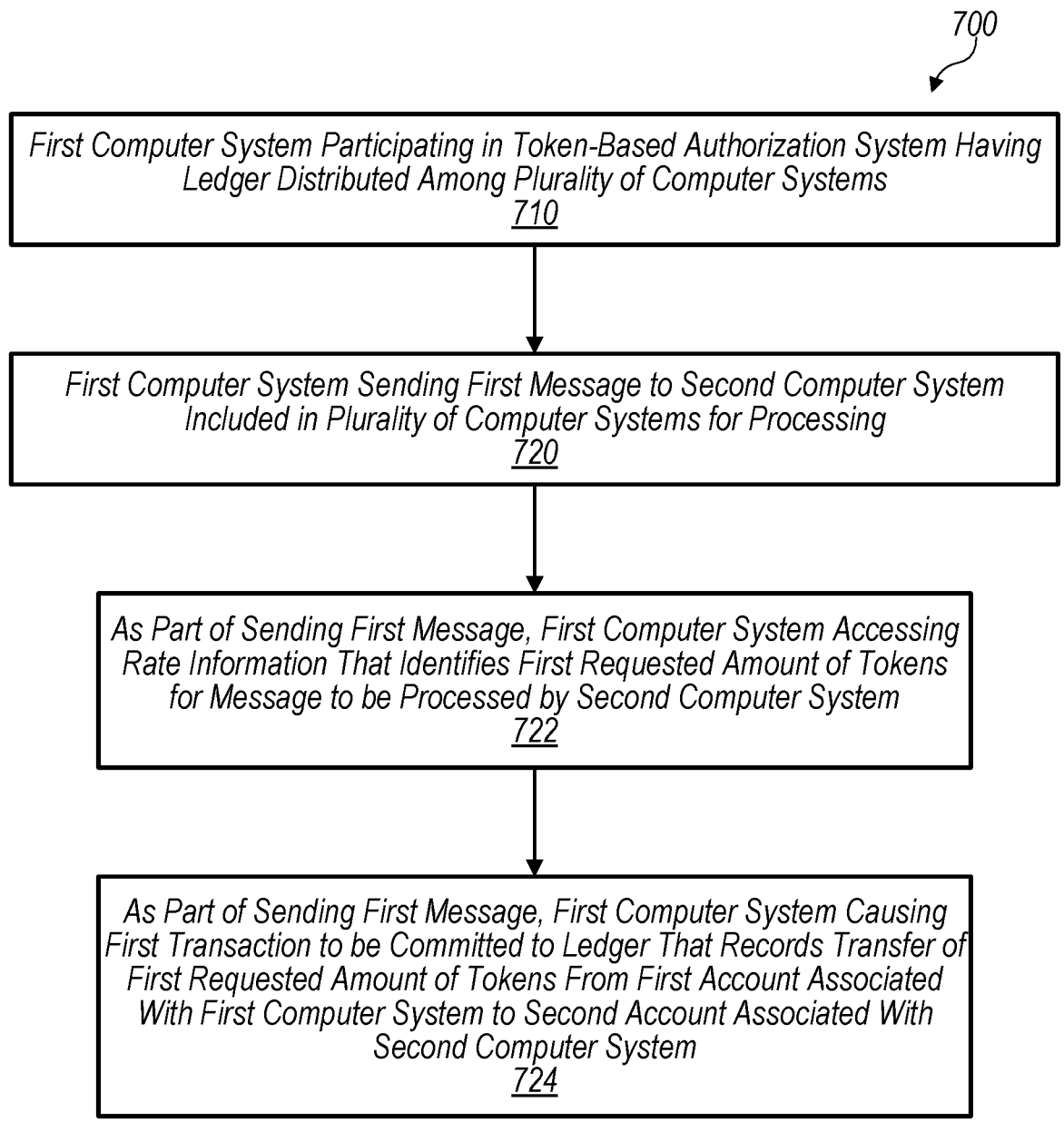

Turning now to FIG. 7, a flow diagram of a method 700 is shown. Method 700 is one embodiment of a method performed by a first computer system (e.g., computer system 110A) in order send a message (e.g., message 115) to a second computer system (e.g., system 110B) for processing. In some embodiments, method 700 may include additional steps—e.g., the first computer system may adjust, based on its processing load, the amount of tokens requested by it before processing a message.

Method 700 begins in step 710 with the first computer system participating in a token-based authorization system (e.g., system 100) having a ledger (e.g., distributed ledger 120) that is distributed among a plurality of computer systems. A computer system may participate in the token-based authorization system by using the ledger to transfer tokens to other computer system in order to have those computer systems process messages. Accordingly, the ledger may be usable to record a transfer of tokens between accounts associated with the plurality of computer systems. In various embodiments, the ledger is a blockchain that cryptographically links records in the blockchain.

In step 720, the first computer system sends a first message (e.g., message 115A) to a second computer system included in the plurality of computer systems for processing. As part of the process for sending the first message, in step 722, the first computer system accesses rate information (e.g., rate information 130B) that identifies a first requested amount of tokens for a message to be processed by the second computer system. In some embodiments, the first requested amount of tokens to process a message varies based on a type of that message. As part of the process for sending the first message, in step 724, the first computer system causes a first transaction to be committed to the ledger that records a transfer of the first requested amount of tokens from a first account associated with the first computer system to a second account associated with the second computer system.

In some cases, the first computer system may process a second message (e.g., message 115B) received from a third computer system (e.g., system 110C) included in the plurality of computer systems. As part of the process for processing the second message, the first computer system may determine, based on a record committed to the ledger, that a second amount of tokens requested by the first computer system has been transferred to the first account of the first computer system from a third account associated with the third computer system.

In some cases, first computer system may determine, based on a record committed to the ledger, that an amount of tokens has been transferred to the first account for processing at least two messages received from a fourth computer system in the plurality of computer systems. The first computer system may then process a third message that is received from the fourth computer system and may maintain an indication that another message is permitted to be processed for the fourth computer system without the fourth computer system having to transfer additional tokens to the first computer system.

Exemplary Computer System

Figure 8:
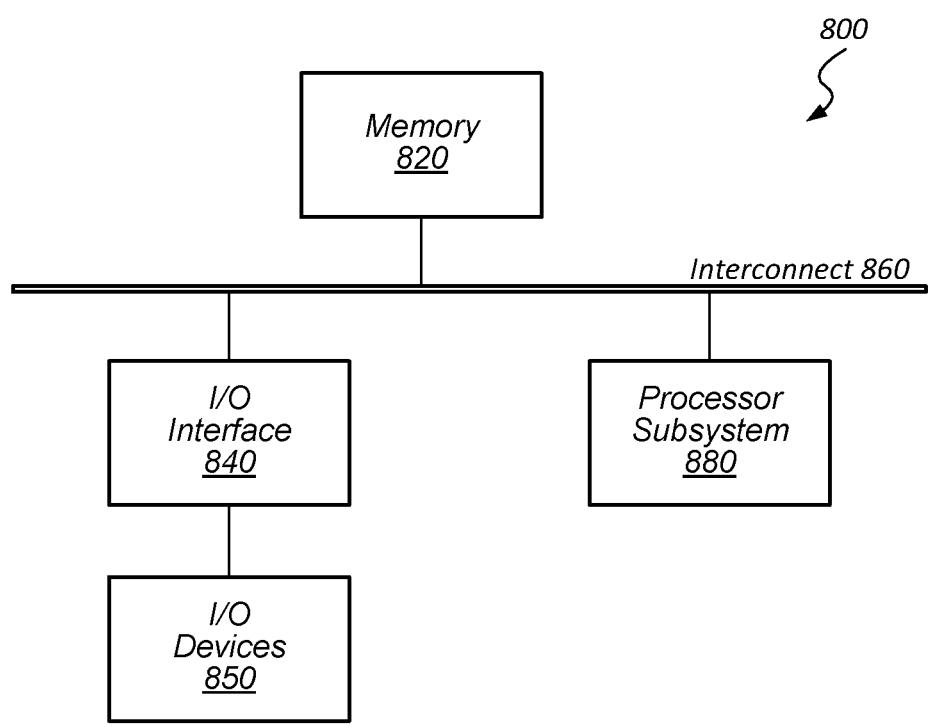
FIG. 8 is a block diagram illustrating an example computer system, according to some embodiments.

Turning now to FIG. 8, a block diagram of an exemplary computer system 800, which may implement a computer system 110 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement message handler 310 and ledger handler 320 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
  a first computer system participating in a token-based message exchange system that includes a ledger that is distributed among a plurality of computer systems that includes at least the first computer system, a second computer system, and a third computer system, wherein the ledger is usable to exchange tokens to facilitate reciprocal exchange of legitimate messages among the plurality of computer systems,
  wherein, for sending a first message, the participating includes the first computer system:
    accessing information identifying a first requested amount of tokens for a message to be processed by the second computer system;
    causing a first transaction to be written to the ledger, wherein the first transaction records a transfer of the first requested amount of tokens from a first token account associated with the first computer system to a second token account associated with the second computer system;

sending the first message to the second computer system for processing, wherein the first message identifies a plurality of tasks to be performed on a database associated with the second computer system; and wherein, for processing a second message received from the third computer system, the participating includes the first computer system:

providing information identifying a second requested amount of tokens for a message to be processed by the first computer system; and processing the second message in response to verifying that the ledger includes a second transaction that records a transfer of the second requested amount of tokens from a third token account associated with the third computer system to the first token account.

2. The method of claim 1, further comprising:
in response to receiving the second message and verifying that the ledger includes the second transaction, the first computer system providing, to the third computer system, a notification indicating that the second message is to be processed.

3. The method of claim 1, further comprising:
the first computer system determining to send the first message based on a priority level of the first message.

4. The method of claim 1, further comprising:
the first computer system determining to not send a third message based on a priority level of the third message not satisfying a threshold priority level; and
in response to determining to not send the third message, the first computer system queuing the third message; and
in response to an adjustment to the threshold priority level resulting in the priority level of the third message satisfying the threshold priority level, the first computer system sending the third message.

5. The method of claim 4, further comprising:
the first computer system dynamically adjusting the threshold priority level in response to changes in the first requested amount of tokens, wherein the adjusting is performed to satisfy one or more criteria.

6. The method of claim 1, further comprising:
the first computer system increasing the second requested amount of tokens for subsequent messages in response to determining to process the second message.

7. The method of claim 1, wherein the first transaction does not identify a particular message, wherein the method further comprises:
the first computer system selecting the first message from a set of messages for sending to the second computer system.

8. The method of claim 1, wherein providing the information identifying the second requested amount of tokens includes:
the first computer system determining the second requested amount of tokens based on a message exchange history between the first computer system and the third computer system.

9. The method of claim 1, further comprising:
the first computer system receiving, in the first token account, an allotment of tokens that is based on a historical message rate associated with the first computer system sending messages to ones of a plurality of computer systems prior to participating in a token-based message exchange system.

10. The method of claim 1, further comprising:
the first computer system determining to process a plurality of messages from a fourth computer system in response to verifying that the ledger includes a third transaction that records a transfer of sufficient tokens for processing the plurality of messages.

11. A non-transitory computer-readable medium having program instructions stored thereon that are capable of causing a first computer system to perform operations comprising:
participating in a token-based message exchange system that includes a ledger distributed among a plurality of computer systems that includes at least the first computer system, a second computer system, and a third computer system, wherein the ledger is usable to exchange tokens to facilitate reciprocal exchange of legitimate messages among the plurality of computer systems, wherein the participating includes:
preparing to send a first message to the second computer system, including by:
accessing information supplied by the second computer system that identifies a first amount of tokens requested by the second computer system to process a message; and
in response to determining that an amount of tokens in a first token account associated with the first computer system satisfies the first amount of tokens, causing a transaction to be written to the ledger as a record that identifies a transfer of the first amount of tokens from the first token account to a second token account associated with the second computer system;
sending the first message to the second computer system for processing, wherein the first message identifies a plurality of tasks to be performed on a database associated with the second computer system;
preparing to process a second message received by a third computer system, including by determining, based on a set of records written in the ledger, whether a second amount of tokens requested by the first computer system has been transferred to the first token account from a third token account associated with the third computer system; and
in response to determining that the second amount of tokens has been transferred to the first token account, processing the second message.

12. The non-transitory computer-readable medium of claim 11, wherein the operations further comprise:
based on the first amount of tokens, determining to send only messages that have at least a particular priority level, wherein the first message is associated with a priority level satisfying the particular priority level.

13. The non-transitory computer-readable medium of claim 11, wherein the operations further comprise:
in response to determining that the second amount of tokens has not been transferred to the first token account, discarding the second message.

14. The non-transitory computer-readable medium of claim 11, wherein the operations further comprise:
adjusting the second amount of tokens based on a processing load of the first computer system.

15. The non-transitory computer-readable medium of claim 11, wherein the operations further comprise:
maintaining a local copy of the ledger; and
in response to writing an additional record to the local copy of the ledger, broadcasting the additional record to the second and third computer systems.

16. A method, comprising:

a first computer system participating in a token-based message exchange system for exchanging tokens to facilitate reciprocal exchange of legitimate messages among a plurality of computer systems, the token-based message exchange system having a ledger distributed among the plurality of computer systems, wherein the ledger is usable to record a transfer of tokens between token accounts of two given computer systems of the plurality of computer systems to cause one of the two given computer systems to process a message;

the first computer system sending, for processing, a first message to a second computer system included in the plurality of computer systems, wherein the first message identifies a plurality of tasks to be performed by the second computer system on a database associated with the second computer system, and wherein sending the first message includes:

accessing rate information that identifies a first requested amount of tokens for a message to be processed by the second computer system; and causing a first transaction to be committed to the ledger that records a transfer of the first requested amount of tokens from a first token account associated with the first computer system to a second token account associated with the second computer system.

17. The method of claim 16, further comprising:

the first computer system processing a second message received from a third computer system included in the plurality of computer systems, wherein processing the second message includes:

determining, based on a record committed to the ledger, that a second amount of tokens requested by the first computer system has been transferred to the first token account from a third token account associated with the third computer system.

18. The method of claim 16, further comprising:

the first computer system determining, based on a record committed to the ledger, that an amount of tokens has been transferred to the first token account for processing at least two messages received from a fourth computer system in the plurality of computer systems;

the first computer system processing a third message received from the fourth computer system; and the first computer system maintaining an indication that another message is permitted to be processed for the fourth computer system without the fourth computer system having to transfer additional tokens to the first token account of the first computer system.

19. The method of claim 16, wherein the first requested amount of tokens for processing a message varies based on a type of that message.

20. The method of claim 16, wherein the ledger is a blockchain that cryptographically links records in the blockchain.

* * * * *